US012803952B2

(12) United States Patent
Shah

(10) Patent No.: US 12,803,952 B2
(45) Date of Patent: Nov. 17, 2026

(54) SYSTEM AND METHOD FOR IP ADDRESS ALLOCATION BASED ON BINARY TREE

(71) Applicant: Alkira, Inc., San Jose, CA (US)

(72) Inventor: Shaival Rajan Shah, Durham, NC (US)

(73) Assignee: Alkira, Inc., San Jose, CA (US)

(*) Notice: Subject to any disclaimer, the term of this patent is extended or adjusted under 35 U.S.C. 154(b) by 140 days.

(21) Appl. No.: 18/892,091

(22) Filed: Sep. 20, 2024

(65) Prior Publication Data

US 2025/0097192 A1 Mar. 20, 2025

Related U.S. Application Data

(60) Provisional application No. 63/584,128, filed on Sep. 20, 2023.

(51) Int. Cl.
*H04L 61/5007* (2022.01)

(52) U.S. Cl.
CPC ................................ *H04L 61/5007* (2022.05)

(58) Field of Classification Search
None
See application file for complete search history.

(56) References Cited

U.S. PATENT DOCUMENTS

2006/0126629 A1* 6/2006 Dooley ............... H04L 61/5061 370/392
2008/0101261 A1* 5/2008 Gorokhov ............ H04L 5/0044 370/256
2010/0293327 A1* 11/2010 Lin .................. H04L 45/74591 711/108
2014/0006575 A1* 1/2014 Subramanian ...... H04L 61/5014 709/222
2014/0032753 A1* 1/2014 Watanabe ........... H04L 67/1097 709/224
2016/0119278 A1* 4/2016 Madan ................ H04L 61/5007 709/245
2021/0297324 A1* 9/2021 Singh ................... G06N 3/0499
2022/0321526 A1* 10/2022 Mang .................. H04L 61/5061

* cited by examiner

*Primary Examiner* — Raqiul A Choudhury
(74) *Attorney, Agent, or Firm* — Vani Moodley, Esq.

(57) ABSTRACT

The present disclosure provides a system and a method for internet protocol (IP) address allocation. The system is configured to determine a height of a binary tree based on a size of an IP subnet. The binary tree comprises a plurality of levels and a plurality of nodes, each level of the plurality of levels includes at least one node of the plurality of nodes. The system is further configured to select a first set of nodes of the plurality of nodes to allocate the IP address for a first group. Each node of the first set of nodes belongs to a different level of the plurality of levels. The system is further configured to assign a second set of nodes of the plurality of nodes as free nodes in the binary tree. Each node of the second set of nodes belongs to the different level.

20 Claims, 6 Drawing Sheets

SYSTEM AND METHOD FOR IP ADDRESS ALLOCATION BASED ON BINARY TREE

TECHNOLOGICAL FIELD

The present disclosure generally relates to Internet Protocol (IP) address allocation process, and more particularly relates to system and methods for IP address allocation based on a binary tree.

BACKGROUND

IP address allocation refers to a process of assigning unique Internet Protocol (IP) addresses to devices connected to a network. An IP address is a numerical label that identifies a device on a network, enabling it to communicate with other devices over the internet.

IP address allocation provides organizations with a necessary framework to manage and organize their network infrastructure effectively. It enables device identification, communication, security, resource management, scalability, and compliance, ensuring smooth network operations and facilitating the achievement of organizational goals. However, allocating IP address effectively, such as with less number of IP address fragmentation is complex.

BRIEF SUMMARY

A system and a method are provided herein that focuses on allocating IP address to one or more groups of resources based on a binary tree.

An object of the present disclosure is to overcome problem relating to inefficient and fragmented allocation of IP addresses, based on a number of IP addresses required by each of the one or more groups of resources.

In an example, IP address allocation based on the binary tree enables allocating IP addresses to one or more groups of resources with less number of IP address fragmentation. Such allocation of IP addresses with less number of fragmentations enables to reduce size of route table of larger networks.

An object of the present disclosure is to allocate IP addresses by accounting for future need of IP addresses for each of the one or more groups of resources.

In one aspect, the present disclosure provides a system for IP addresses allocation. The system comprises at least one non-transitory memory configured to store computer executable instructions, and at least one processor configured to execute the computer executable instructions to determine a height of a binary tree based on a size of an IP subnet. The binary tree comprises a plurality of levels and a plurality of nodes, and each level of the plurality of levels includes at least one node of the plurality of nodes. The at least one processor is further configured to select a first set of nodes of the plurality of nodes to allocate the IP address for a first group. Each node of the first set of nodes belongs to a different level of the plurality of levels. The at least one processor is further configured to assign a second set of nodes of the plurality of nodes as free nodes in the binary tree. Each node of the second set of nodes belongs to the different level of the plurality of levels.

In some embodiments, each node of the first set of nodes is a left child node of a parent node corresponding to a level of the plurality of levels of the binary tree.

In some embodiments, each node of the second set of nodes is a right child node of the parent node corresponding to the level of the plurality of levels, and each node of the second set of nodes corresponds to a node of the first set of nodes.

In some embodiments, the at least one processor is further configured to allocate the IP address for the first group till a level of the plurality of levels at which a node of the plurality of nodes is assigned to the first group.

In some embodiments, the at least one processor is further configured to utilize a first free node of the second set of nodes to initiate allocation of an IP address of a second group in the binary tree. A distance between the IP subnet of the first group and an IP subnet of the second group is maximum in the binary tree.

In another aspect, the present disclosure provides a method for IP addresses allocation. The method comprises determining a height of a binary tree based on a size of an IP subnet. The binary tree comprises a plurality of levels and a plurality of nodes, and each level of the plurality of levels includes at least one node of the plurality of nodes. The method further comprises selecting a first set of nodes of the plurality of nodes to allocate the IP address for a first group. Each node of the first set of nodes belongs to a different level of the plurality of levels. The method further comprises assigning a second set of nodes of the plurality of nodes as free nodes in the binary tree. Each node of the second set of nodes belongs to the different level of the plurality of levels.

BRIEF DESCRIPTION OF THE DRAWINGS

Figure 1:
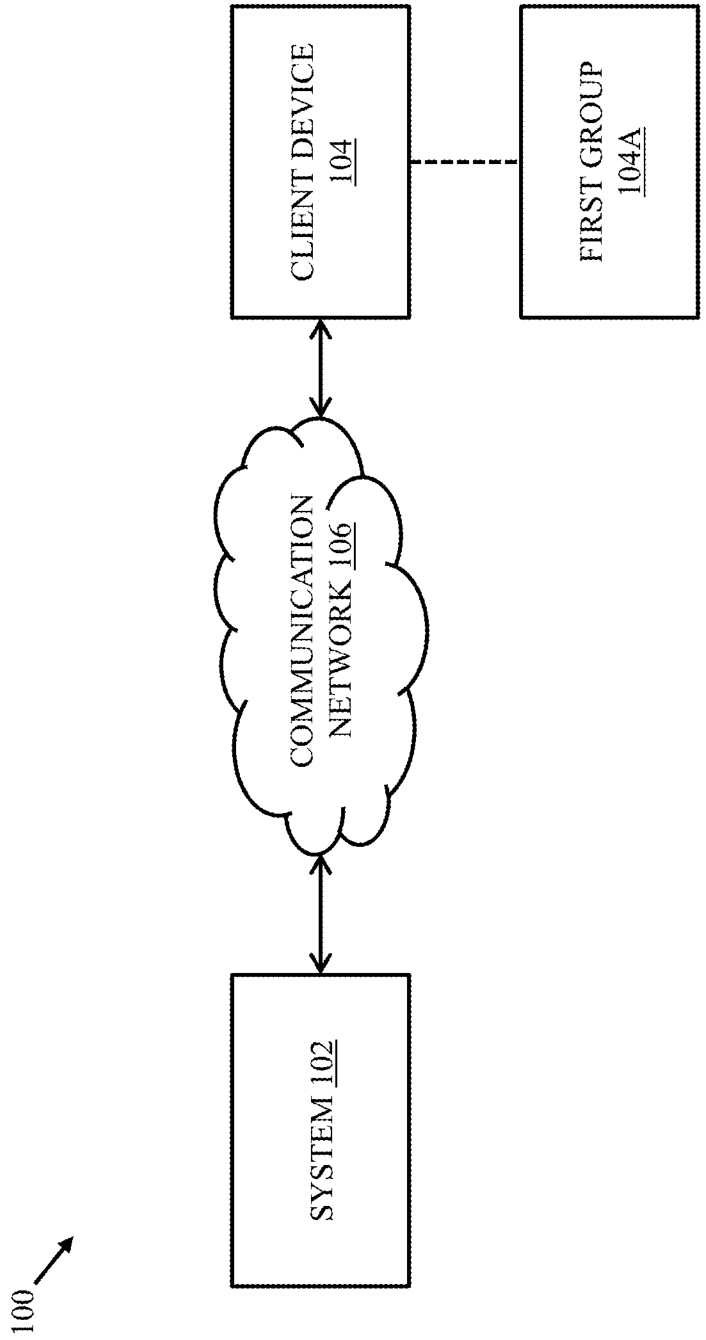
Figure 2:
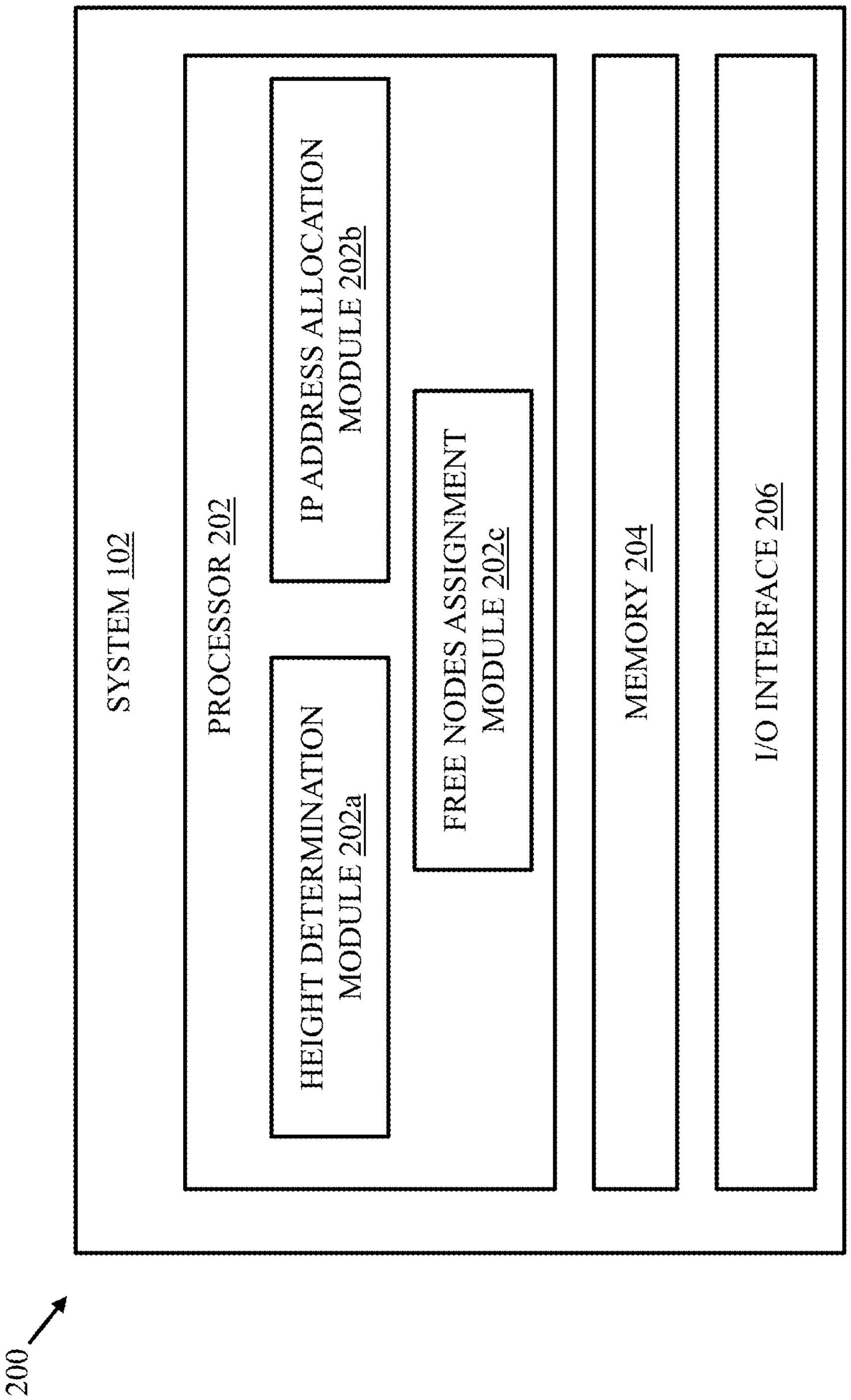
Figure 3A:
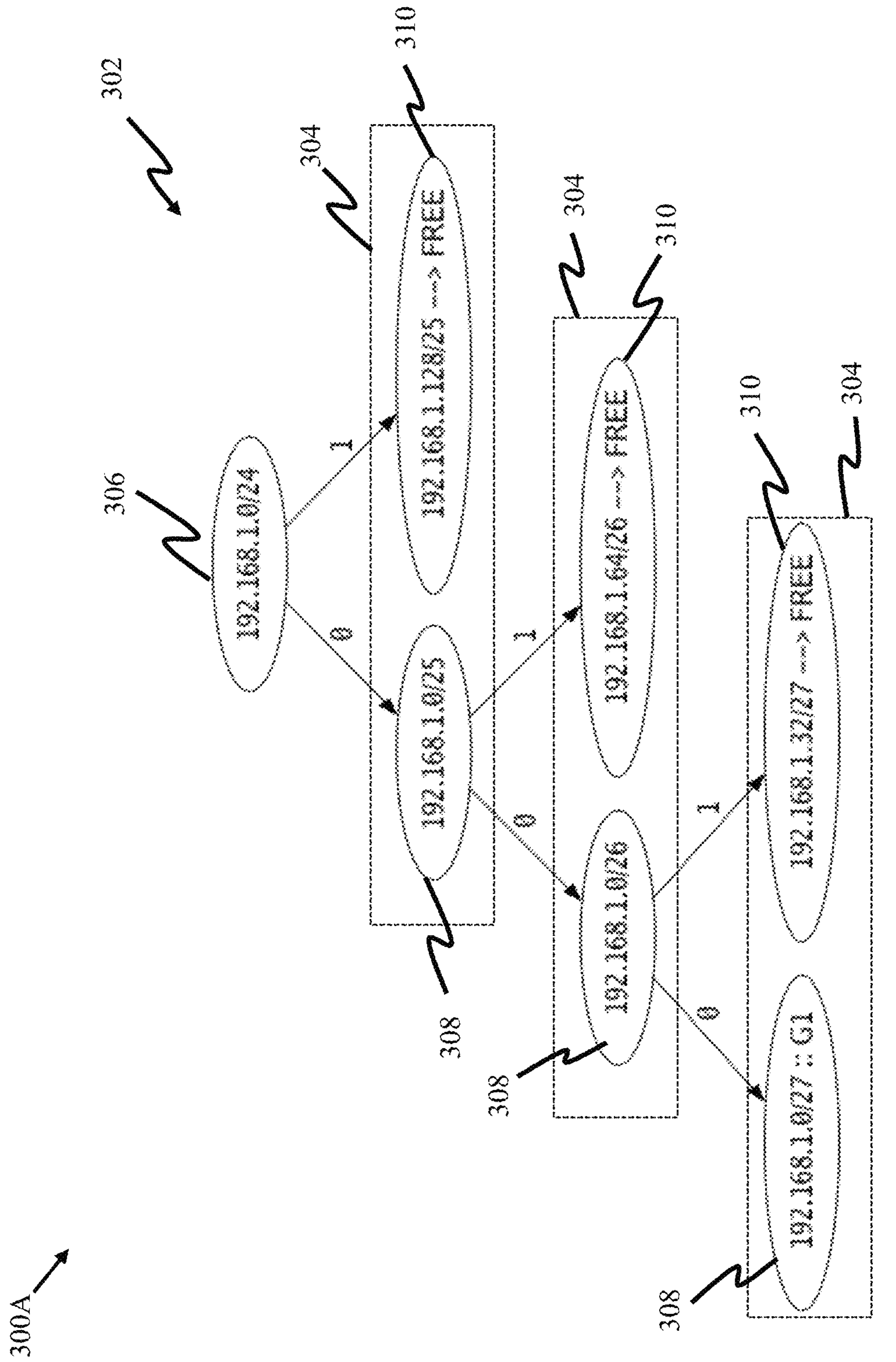
Figure 3B:
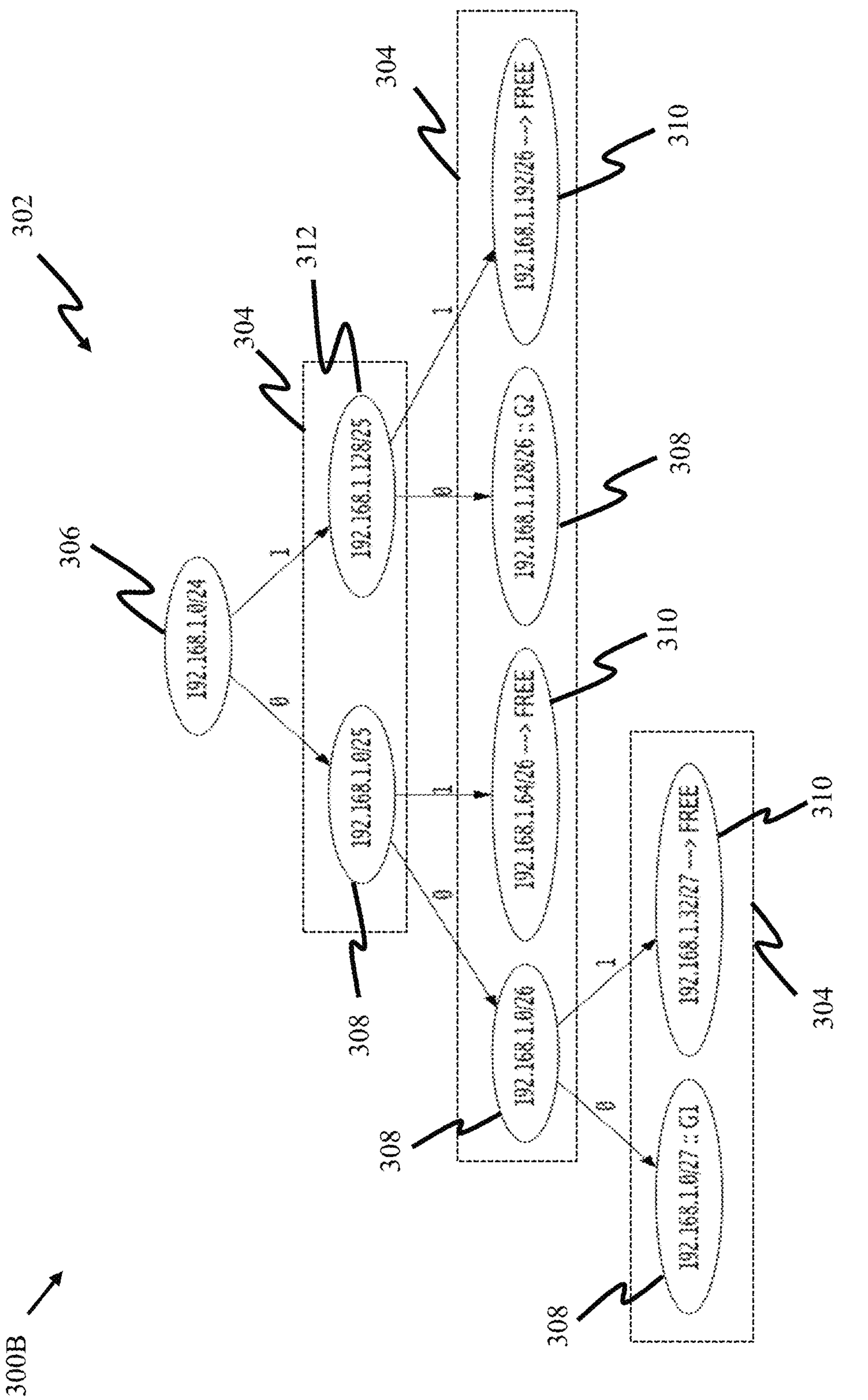
Figure 3C:
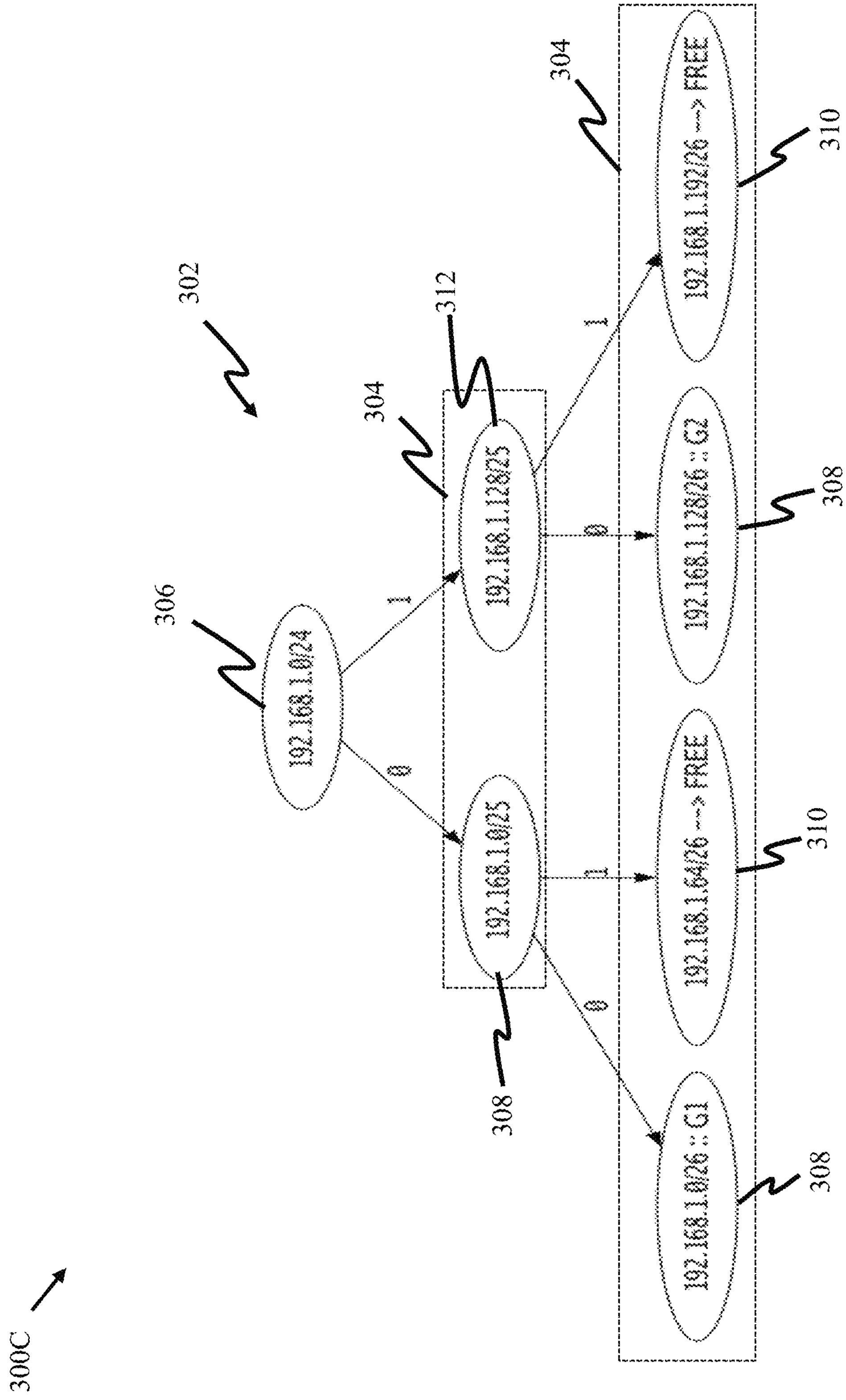
Figure 4:
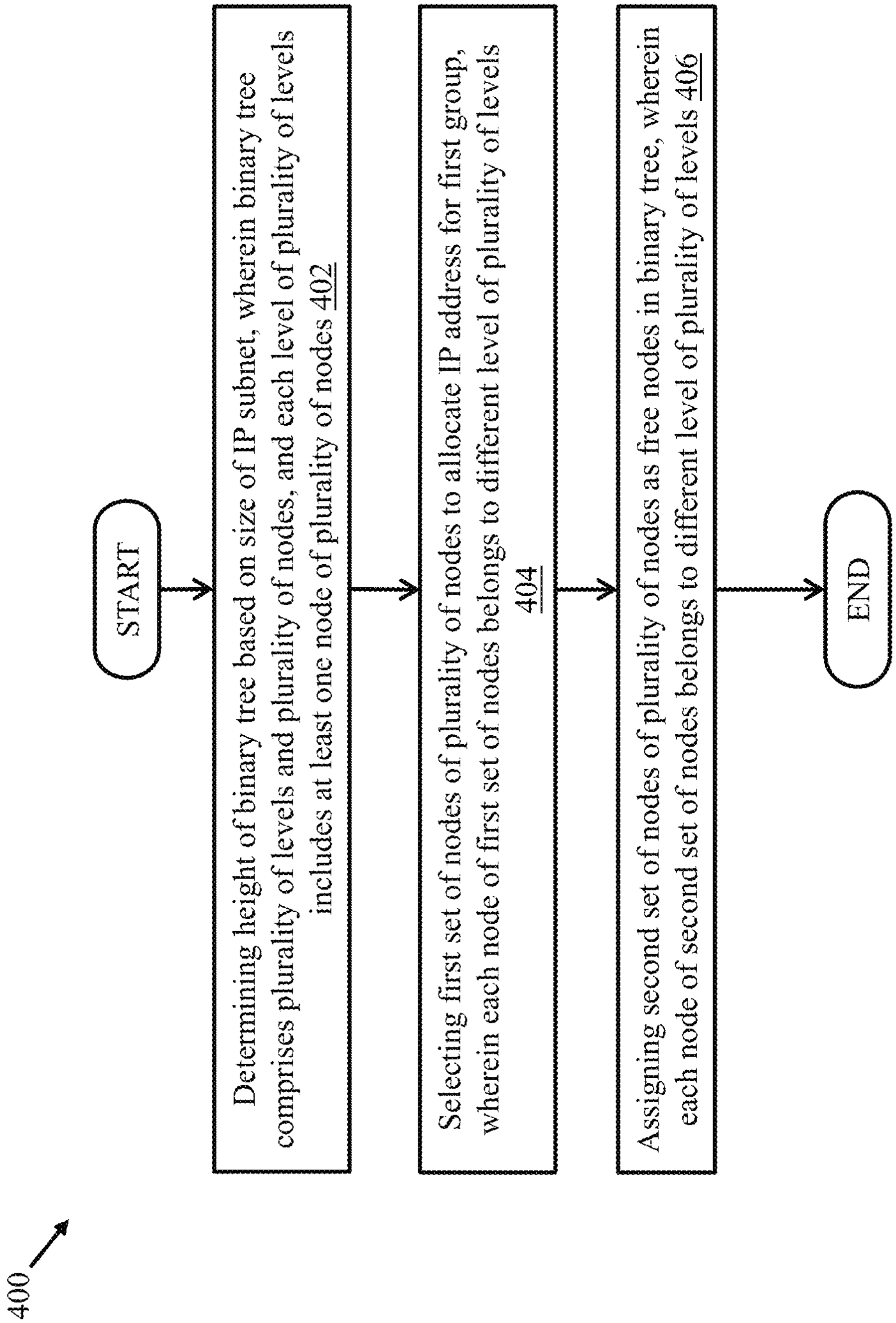

Having thus described example embodiments of the disclosure in general terms, reference will now be made to the accompanying drawings, which are not necessarily drawn to scale, and wherein:

FIG. 1 illustrates a network environment of a system for allocating IP address to one or more groups of resources, according to an example embodiment of the present disclosure;

FIG. 2 illustrates a block diagram of the system for allocating IP address to one or more groups of resources, according to an example embodiment of the present disclosure;

FIGS. 3A, 3B and 3C collectively illustrate the allocation of the IP address using an exemplary binary tree, in accordance with an example embodiment of the present disclosure; and FIG. 4 illustrates a flowchart for implementation of an exemplary method for allocating IP address to one or more groups of resources, in accordance with an example embodiment of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect. Turning now to FIG. 1-FIG. 4, a brief description concerning the various components of the present disclosure will now be briefly discussed. Reference will be made to the figures showing various embodiments of a system for allocating an IP address to one or more groups of resources.

FIG. 1 illustrates a network environment 100 of a system 102 for allocating IP address to one or more groups of resources, according to an example embodiment of the present disclosure. The network environment 100 may include the system 102, a client device 104 associated with a first group 108, and a communication network 106.

The system 102 may be embodied in one or more of several ways as per the required implementation. For example, the system 102 may be embodied as a cloud-based service or a cloud-based platform. In each of such embodiments, the system 102 may be communicatively coupled to the components shown in FIG. 1 to carry out the desired operations and wherever required modifications may be possible within the scope of the present disclosure. The system 102 may be implemented in an electronic device. Further, in one embodiment, the system 102 may be a standalone unit configured to allocate the IP address to the one or more groups. In an embodiment, the system 102 may also be referred to as the client device 104, or the system 102 may be embodied within the client device 104. In some example embodiments, the system 102 may be any user accessible device such as a mobile phone, a smartphone, a portable computer, and the like that are portable in themselves or as a part of another portable/mobile object such as a vehicle. The system 102 may comprise a processor, a memory, and a communication interface. The processor, the memory and the communication interface may be communicatively coupled to each other. In such example embodiments, the system 102 may comprise a processing means such as a central processing unit (CPU), storage means such as on-board read only memory (ROM) and random access memory (RAM), a display enabled user interface such as a touch screen display, and other components as may be required for specific functionalities of system 102. Additional, different, or fewer components may be provided.

The client device 104 may be any user accessible device such as a mobile phone, a smartphone, a portable computer, and the like, as a part of another portable/mobile object. The client device 104 may comprise a processor, a memory, and a communication interface. The processor, the memory and the communication interface may be communicatively coupled to each other. In some example embodiments, the client device 104 may be associated, coupled, or otherwise integrated with the system 102 that may be configured to allocate the IP address to the one or more groups. In such example embodiments, the client device 104 may comprise processing means such as a central processing unit (CPU), storage means such as on-board read only memory (ROM) and random access memory (RAM), a display enabled user interface such as a touch screen display, and other components as may be required for specific functionalities of the client device 104. Additional, different, or fewer components may be provided. In one embodiment, the client device 104 may be directly coupled to the system 102 via the communication network 106.

The communication network 106 may be wired, wireless, or any combination of wired and wireless communication networks, such as cellular, Wi-Fi, internet, local area networks, or the like. In one embodiment, the communication network 106 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

In operation, the system 102 may be configured to receive a request for IP address allocation for a group, such as the first group 104A. The system 102 may determine a height of a binary tree based on a size of an IP subnet. The binary tree may include a plurality of levels and a plurality of nodes, and each level of the plurality of levels includes at least one node of the plurality of nodes. The system 102 determines a number of IP addresses needed for the first group 104A. The system 102 then converts IPv4 decimal addresses into binary form within an address space range, and further constructs a binary tree structure to allocate the IP addresses to the one or more groups, such as the first group 104A.

The system 102 may select a first set of nodes of the plurality of nodes to allocate the IP address for a first group 104A. Each node of the first set of nodes belongs to a different level of the plurality of levels. The system 102 may assign a second set of nodes of the plurality of nodes as free nodes in the binary tree. Each node of the second set of nodes belongs to the different level of the plurality of levels. For example, the system 102 apply an algorithm that starts from a root node of the binary tree and keeps on going to a left child of the binary tree to allocate the IP address and marking a right child node as a free node, when it is under an end IP address. In some embodiments, the system 102 allocates the IP address for the first group 104A till a level of the plurality of levels at which a node of the plurality of nodes is assigned to the first group. For example, the algorithm keeps on going till it reaches the level where it can assign the node to the first group 104A.

In some embodiments, the system 102 may utilize a first free node of the second set of nodes to initiate allocation of an IP address of a second group in the binary tree. A distance between the IP subnet of the first group 104A and an IP subnet of the second group is maximum in the binary tree. For example, the algorithm may assign a farthest IP subnet possible from the IP subnet of the first group 104A that is already assigned. Thus, by using the free nodes that were marked by the previous run, the IP address may be allocated to the second group as well. For example, the algorithm may start from a root level of the plurality of levels and check if a free node is available. If the free node is available, the algorithm takes that node or goes to the next level. After getting the free node from the topmost level, the system 102 applies the same algorithm that was used to assign the previous group, i.e., the first group 104A.

FIG. 2 illustrates a block diagram 200 of the system 102 for allocating IP address to one or more groups of resources, according to an example embodiment of the present disclosure. The block diagram 200 includes a processor 202, a memory 204 and an input/output (I/O) interface 206. The processor 202 may include a height determination module 202*a*, an IP address allocation module 202*b* and a free nodes assignment module 202*c*.

The processor 202 may be embodied in a number of different ways. For example, the processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package. Additionally, or alternatively, the processor 202 may include one or more processors configured in tandem via the bus to enable independent execution of instructions, pipelining and/or multithreading.

In some embodiments, the processor 202 may be configured to provide Internet-of-Things (IoT) related capabilities to users of the system 102 or the client device 104.

Additionally, or alternatively, the processor 202 may include one or more processors capable of processing large volumes of workloads and operations to provide support for big data analysis. In an example embodiment, the processor 202 may be in communication with the memory 204 via a bus for passing information among components coupled to the system 102.

The height determination module 202*a* may be configured to determine the height of the binary tree based on the size of the IP subnet. The binary tree may include the plurality of levels and the plurality of nodes, and each level of the plurality of levels includes at least one node of the plurality of nodes. The IP address allocation module 202*b* may be configured to select the first set of nodes of the plurality of nodes to allocate the IP address for the first group 104A. Each node of the first set of nodes belongs to the different level of the plurality of levels. The free nodes assignment module 202*c* may be configured to assign the second set of nodes of the plurality of nodes as free nodes in the binary tree. Each node of the second set of nodes belongs to the different level of the plurality of levels.

The memory 204 may be non-transitory and may include, for example, one or more volatile and/or non-volatile memories. In other words, for example, the memory 204 may be an electronic storage device (for example, a computer readable storage medium) comprising gates configured to store data (for example, bits) that may be retrievable by a machine (for example, a computing device like the processor 202). The memory 204 may be configured to store information, data, content, applications, instructions, or the like, for enabling the apparatus to carry out various functions in accordance with an example embodiment of the present invention. For example, the memory 204 may be configured to buffer input data for processing by the processor 202. As exemplarily illustrated in FIG. 2, the memory 204 may be configured to store instructions for execution by the processor 202. As such, whether configured by hardware or software methods, or by a combination thereof, the processor 202 may represent an entity (for example, physically embodied in circuitry) capable of performing operations according to an embodiment of the present invention while configured accordingly. Thus, for example, when the processor 202 is embodied as an ASIC, FPGA or the like, the processor 202 may be specifically configured hardware for conducting the operations described herein. Alternatively, as another example, when the processor 202 is embodied as an executor of software instructions, the instructions may specifically configure the processor 202 to perform the algorithms and/or operations described herein when the instructions are executed. However, in some cases, the processor 202 may be a processor specific device (for example, a mobile terminal or a fixed computing device) configured to employ an embodiment of the present invention by further configuration of the processor 202 by instructions for performing the algorithms and/or operations described herein. The processor 202 may include, among other things, a clock, an arithmetic logic unit (ALU) and logic gates configured to support operation of the processor 202.

The I/O interface 206 may comprise suitable logic, circuitry, and/or interfaces that may be configured to act as an I/O channel between a user and the system 102. The I/O interface 206 may be configured to receive a user input. In some embodiments, the system 102 may receive user input, via the I/O interface 206. The I/O interface 206 may comprise various input and output devices, which may be configured to communicate with different operational components of the system 102. Examples of the I/O interface 206 may include, but are not limited to, a touch screen, a keyboard, a mouse, a joystick, a microphone, and a display screen.

FIGS. 3A, 3B and 3C collectively illustrate the allocation of the IP address using an exemplary binary tree, in accordance with an example embodiment of the present disclosure. FIG. 3A illustrates a diagram 300A. The diagram 300A may include a binary tree 302. The binary tree 302 may include a plurality of levels 304. The binary tree 302 may include a plurality of nodes, such as a root node 306, a first set of nodes 308 and a second set of nodes 310.

The system 102 may determine the height of the binary tree based on the size of the IP subnet. For example, an IP subnet may be depicted as "192.168.1.0/24". In an example, 32 IPs (or IP addresses) may be needed for the first group (G1) 104A and 64 Ips may be needed for a second group (G2) in the binary tree. Given an IP address space range, thIPv4 decimal address may be converted into the binary form. The IP subnet 192.168.1.0/24 may be represented in the binary form as "00010010 01001000 00000001 00000000". Given the size of the IP subnet, also called Classless inter domain routing (CIDR), the height of the binary tree is decided:

$$\text{Height of tree} = 32 - \text{Network } CIDR \text{ Size} \tag{1}$$

Thus, the height of the binary tree=32−24=8.

Furthermore, the system 102 may select the first set of nodes 308 of the plurality of nodes to allocate the IP address for the first group 104A. Each node of the first set of nodes 308 belongs to a different level of the plurality of levels 304. In some embodiments, each node of the first set of nodes 308 may be a left child node of a parent node corresponding to a level of the plurality of levels 304 of the binary tree 302. Moreover, the system 102 may assign the second set of nodes 310 of the plurality of nodes as free nodes in the binary tree 302. Each node of the second set of nodes 310 belongs to the different level of the plurality of levels 304. In some embodiments, each node of the second set of nodes may be a right child node of the parent node corresponding to the level of the plurality of levels 304, and each node of the second set of nodes 310 corresponds to a node of the first set of nodes 308. Given the number of IPs needed for the first group 104A, the system 102 may start from the root node 306 of the binary tree 302 and keeps on going to the left child of the binary tree 302 and marking the right child as the free node if it is under the end IP address.

In some embodiments, the system 102 may be further configured to allocate the IP address for the first group 104A till a level of the plurality of levels 304 at which a node of the plurality of nodes is assigned to the first group 104A. For example, the system 102 may apply the algorithm till it reaches the level where it may assign the node to the first group 104A. Such a decision may be based on the level the node is situated.

$$\text{Root Node:level} = 0,\ CIDR\ size = 24 \tag{2}$$

As the level goes down, the CIDR size may increase by 1. Thus, the algorithm may be applied down the levels until it reaches the level where below it, it may be unable to encloses all the IPs that are needed for the first group 104A. The IP allocation may be depicted as follows:

$$G1\ (32\ IPs) \rightarrow \text{Goes down to level 3} \rightarrow CIDR = 27 \rightarrow \text{Subnet} = 192.168.1.0/27 \tag{3}$$

FIG. 3B illustrates a diagram 300B. The diagram 300B may include the binary tree 302. The binary tree 302 may include the plurality of levels 304. The binary tree 302 may include the plurality of nodes, such as the root node 306, the first set of nodes 308 and the second set of nodes 310. The binary tree 302 may also include a first free node 312 of the second set of nodes 310.

In some embodiments, the system 102 may be further configured to utilize the first free node 312 of the second set of nodes 310 to initiate allocation of an IP address of the second group in the binary tree 302. A distance between the IP subnet of the first group 104A and an IP subnet of the second group (G2) is maximum in the binary tree 302. For the next group that is G2 where 64 IPs are needed, the system 102 may assign a farthest IP subnet possible from the current group's subnet, i.e., the IP subnet of the first group 104A that is already assigned. For this, the system 102 may take help of the free nodes that were marked by a previous run of the IP allocation. The system 102 may start from the root level and check if a free node is available. If the free node is available, the system 102 may take that node or go to the next level after getting the free node from the topmost level. For example, the first free node 312 at a level 1 is selected as the initial node for the IP allocation. The system 102 may apply the same algorithm used to assign the first group 104A. The IP address allocation of G2 is depicted as:

$$G2\ (64\ IPs) \rightarrow \text{free nose available at level 1} \rightarrow \text{Node } CIDR = 25 \rightarrow 192.168.1.128/25 \tag{4}$$

The system 102 may keep on assigning the IP address to the left node until it reaches the node that below it, it cannot allocate all IPs. For G2:

$$\text{Subnet} = 192.168.1.128/26 \tag{5}$$

FIG. 3C illustrates a diagram 300C. The diagram 300C may include the binary tree 302. The binary tree 302 may include the plurality of levels 304. The binary tree 302 may include the plurality of nodes, such as the root node 306, the first set of nodes 308 and the second set of nodes 310. The binary tree 302 may also include the first free node 312 of the second set of nodes 310.

In an example, after a while, the binary tree 302 may have limited space. In such a case, the system 102 may allocate 2 IP subnets for the same group based on availability. The goal of the system 102 is to reduce the number and pack all the IPs under the same IP subnet as much as possible. In such a manner, the IP subnets may get assigned to the group. For example, if the same group needs more IPs, the system 102 may first check if it can be given a larger subnet that encloses the currently assigned subnet and new requirements. Again, the system 102 may perform this to the extent of free IPs available.

Let say G1 needs 32 more IPs. In such a case, the system 102 may checks if the right sibling node of the node that is assigned the same group is a free node. If it is a free node, then it takes that node and applies the algorithm to assign a group to the node based on the number of IPs needed. After getting the node, the system 102 may check if the node is the right node and its left sibling has the same group assigned to it. If such is the case, the system 102 may pack it with the left node and assign the parent node to that same group. In such a manner, the system 102 may provide a single larger subnet saving the number of routes in the route table. Such an allocation is represented as:

$$\text{For } G1 \text{ ->} \tag{6}$$

$$\text{finding the right sibling at } CIDR \text{ level 27 of original subnet}$$

$$G1 \text{ -> } 192.168.1.0/ \tag{7}$$

$$27\ \&\ 192.168.1.16/27 =\ >$$

$$192.168.1.0/26$$

Essentially, such a logic makes sure that if a new group comes, it has the maximum possible continuous space available to assign a single subnet to that group rather than breaking it into multiple subnets. Also, it makes sure that for the same group it gives the new subnet closer to the original subnet and also packs it with it if possible and gives a larger subnet.

A time complexity may be defined for assignment to the group as:

$$TC = \log(m) - \log(n) = \tag{8}$$

$$O(\log(m))\ (m > n)$$

To get the group of the IP given:

$$TC = O(\log(m)) \text{ OR } O(h)(h = \log(m)) \tag{9}$$

A space complexity may be defined for assignment to the group as:

$$\text{Total binary node:} SC = O(m) \tag{10}$$

$$\text{Free nodes:} SC = O(m) \tag{11}$$

where n=given number of IPs required, h=height of tree and m=number of IPs available.

FIG. 4 illustrates a flowchart for implementation of an exemplary method 400 for allocating IP address to one or more groups of resources, in accordance with an example embodiment of the present disclosure.

At step 402, the method 400 may include determining the height of the binary tree 302 based on the size of the IP subnet. The binary tree 302 may include the plurality of levels 304 and the plurality of nodes, and each level of the plurality of levels may include at least one node of the plurality of nodes. Details of determining the height are further provided, for example, in FIG. 3A.

At step 404, the method may include selecting the first set of nodes 308 of the plurality of nodes to allocate the IP address for the first group 104A. Each node of the first set of nodes 308 belongs to a different level of the plurality of levels 304. Details of selecting the first set of nodes 308 are further provided, for example, in FIG. 3A.

At step 406, the method may include assigning the second set of nodes 310 of the plurality of nodes as free nodes in the binary tree 302. Each node of the second set of nodes 310 belongs to the different level of the plurality of levels 304. Details of assigning the second set of nodes 310 are further provided, for example, in FIG. 3A.

Accordingly, blocks of the flowchart support combinations of means for performing the specified functions and combinations of operations for performing the specified functions. It will also be understood that one or more blocks of the flowchart can be implemented by special purpose hardware-based computer systems which perform the specified functions, or combinations of special purpose hardware and computer instructions.

Alternatively, the system 102 may comprise means for performing each of the operations described above. In this regard, according to an example embodiment, examples of means for performing operations may comprise, for example, a processor and/or a device or circuit for executing instructions, such as the operations or instructions for allocation of IP address.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A system for internet protocol (IP) address allocation, the system comprising:

at least one non-transitory memory configured to store computer executable instructions; and at least one processor configured to execute the computer executable instructions to:

determine a height of a binary tree based on a size of an IP subnet, wherein the binary tree comprises a plurality of levels and a plurality of nodes, and each level of the plurality of levels includes at least one node of the plurality of nodes;

select a first set of nodes of the plurality of nodes to allocate the IP address for a first group, wherein each node of the first set of nodes belongs to a different level of the plurality of levels;

assign a second set of nodes of the plurality of nodes as free nodes in the binary tree, wherein each node of the second set of nodes belongs to the different level of the plurality of levels; and allocate multiple IP subnets for the first group based on availability when the binary tree has limited space, wherein the at least one processor is further configured to reduce a number of IP address fragmentations.

2. The system of claim 1, wherein each node of the first set of nodes is a left child node of a parent node corresponding to a level of the plurality of levels of the binary tree.

3. The system of claim 2, wherein each node of the second set of nodes is a right child node of the parent node corresponding to the level of the plurality of levels, and wherein each node of the second set of nodes corresponds to a node of the first set of nodes.

4. The system of claim 1, wherein the at least one processor is further configured to allocate the IP address for the first group till a level of the plurality of levels at which a node of the plurality of nodes is assigned to the first group.

5. The system of claim 1, wherein the at least one processor is further configured to utilize a first free node of the second set of nodes to initiate allocation of an IP address of a second group in the binary tree, and wherein a distance between an IP subnet of the first group and an IP subnet of the second group is maximum in the binary tree.

6. A method for internet protocol (IP) address allocation, comprising:

determining a height of a binary tree based on a size of an IP subnet, wherein the binary tree comprises a plurality of levels and a plurality of nodes, and each level of the plurality of levels includes at least one node of the plurality of nodes;

selecting a first set of nodes of the plurality of nodes to allocate the IP address for a first group, wherein each node of the first set of nodes belongs to a different level of the plurality of levels;

assigning a second set of nodes of the plurality of nodes as free nodes in the binary tree, wherein each node of the second set of nodes belongs to the different level of the plurality of levels; and allocating multiple IP subnets for the first group based on availability when the binary tree has limited space, wherein the method is configured to reduce a number of IP address fragmentations.

7. The method of claim 6, wherein determining the height of the binary tree comprises using a specific algorithm based on the size of the IP subnet.

8. The method of claim 6, wherein selecting the first set of nodes comprises prioritizing nodes based on historical data of IP address usage.

9. The method of claim 6, wherein assigning the second set of nodes as free nodes comprises implementing a priority system for free nodes based on their level in the binary tree.

10. The method of claim 6, wherein each node in the second set of nodes is a direct sibling of a node in the first set of nodes.

11. The method of claim 6, further comprising utilizing a first free node of the second set of nodes to initiate allocation of an IP address for a second group.

12. The method of claim 11, wherein a distance between an IP subnet of the first group and an IP subnet of the second group is maximum in the binary tree.

13. The method of claim 6, further comprising using a defragmentation algorithm to periodically reorganize the binary tree to reduce IP address fragmentation.

14. The method of claim 6, further comprising implementing a forecasting model to predict future IP address requirements and reserving additional nodes in the binary tree for anticipated future needs.

15. A non-transitory computer-readable medium storing instructions that, when executed by at least one processor, cause the at least one processor to perform a method for internet protocol (IP) address allocation, the method comprising:

determining a height of a binary tree based on a size of an IP subnet, wherein the binary tree comprises a plurality of levels and a plurality of nodes, and each level of the plurality of levels includes at least one node of the plurality of nodes;

selecting a first set of nodes of the plurality of nodes to allocate the IP address for a first group, wherein each node of the first set of nodes belongs to a different level of the plurality of levels;

assigning a second set of nodes of the plurality of nodes as free nodes in the binary tree, wherein each node of the second set of nodes belongs to a different level of the plurality of levels;

utilizing a first free node of the second set of nodes to initiate allocation of an IP address for a second group, wherein a distance between an IP subnet of the first group and an IP subnet of the second group is maximum in the binary tree; and allocating multiple IP subnets for the same group based on availability when the binary tree has limited space, wherein the method is configured to reduce the number of IP address fragmentations.

16. The non-transitory computer-readable medium of claim 15, wherein determining the height of the binary tree comprises using a specific algorithm based on the size of the IP subnet.

17. The non-transitory computer-readable medium of claim 15, wherein selecting the first set of nodes comprises prioritizing nodes based on historical data of IP address usage.

18. The non-transitory computer-readable medium of claim 15, wherein assigning the second set of nodes as free nodes comprises implementing a priority system for free nodes based on their level in the binary tree.

19. The non-transitory computer-readable medium of claim 15, wherein each node in the second set of nodes is a direct sibling of a node in the first set of nodes.

20. The non-transitory computer-readable medium of claim 15, further comprising utilizing a first free node of the second set of nodes to initiate allocation of an IP address for a second group.

* * * * *